United States Patent
Hawker et al.

(10) Patent No.: US 10,828,764 B2
(45) Date of Patent: Nov. 10, 2020

(54) KEY SHAPED MULTITOOL

(71) Applicant: NITE IZE, INC., Boulder, CO (US)

(72) Inventors: Christopher Hawker, Columbus, OH (US); Matthew Seibert, Columbus, OH (US); Joel Beebe, Columbus, OH (US)

(73) Assignee: NITE IZE, INC., Boulder, CO (US)

( * ) Notice: Subject to any disclaimer, the term of this patent is extended or adjusted under 35 U.S.C. 154(b) by 186 days.

(21) Appl. No.: 15/122,871

(22) PCT Filed: Mar. 5, 2015

(86) PCT No.: PCT/US2015/018944
§ 371 (c)(1),
(2) Date: Aug. 31, 2016

(87) PCT Pub. No.: WO2015/134736
PCT Pub. Date: Sep. 11, 2015

(65) Prior Publication Data
US 2017/0066117 A1    Mar. 9, 2017

Related U.S. Application Data

(60) Provisional application No. 61/948,143, filed on Mar. 5, 2014.

(51) Int. Cl.
*B25F 1/00*     (2006.01)
*B23D 71/04*    (2006.01)
(Continued)

(52) U.S. Cl.
CPC ............... *B25F 1/00* (2013.01); *A45D 29/04* (2013.01); *B23D 71/04* (2013.01); *B25B 15/007* (2013.01); *B67B 7/16* (2013.01); *B67B 7/44* (2013.01)

(58) Field of Classification Search
CPC ........... B25F 1/00; A45D 29/04; B23D 71/04; B25B 15/007; B67B 7/16; B67B 7/44; B67B 7/18; B67B 7/403; B67B 2007/0458
See application file for complete search history.

(56) References Cited

U.S. PATENT DOCUMENTS 3,570,028 A * 3/1971 De La Hitte ............. B67B 7/18
                                                81/3.4
6,263,761 B1 * 7/2001 Ryder ....................... B67B 7/04
                                                7/151
(Continued)

FOREIGN PATENT DOCUMENTS

CN        2088024 U     11/1991
CN      200949339 Y      9/2007
(Continued)

OTHER PUBLICATIONS

Multi-tool Key Holder (online). Indiegogo [retrieved Aug. 30, 2016] Retrieved from the internet: https://www.indiegogo.com/projects/everyday-carry-survival-kit-collection-of-outdoor-tools-save-you-from-emergency#/ (15 pages).

(Continued)

*Primary Examiner* — Robert T Scruggs
(74) *Attorney, Agent, or Firm* — Haynes and Boone, LLP

(57) ABSTRACT

A multi-tool includes a keyshaped body, the keyshaped body having a key like shape and a standard key size. The keyshaped body includes a rounded end, the rounded end including a aperture for a key chain and a textured surface configured to provide grip to the hand of a user. The keyshaped body further includes a slim extending end, opposite the rounded end, the slim extending end including a tip, the tip having a wedge end, the wedge end shaped such that it functions as a screw driver, the slim end further included a left and right side, the left side having a grooved surface shaped such that it functions as file, the right side (Continued)

including a cutting surface and a lip, the lip providing for a bottle opener in conjunction with an aperture in which the cutting surface is located and using the keyshaped body as a lever arm.

16 Claims, 3 Drawing Sheets

(51) Int. Cl.
  *B67B 7/16*  (2006.01)
  *B67B 7/44*  (2006.01)
  *A45D 29/04* (2006.01)
  *B25B 15/00* (2006.01)

(56) References Cited

U.S. PATENT DOCUMENTS

| | | | |
|---|---|---|---|
| D500,648 S | * | 1/2005 | Kelleghan ................... D8/38 |
| 8,966,690 B2 | | 3/2015 | Stokes et al. |
| 9,815,512 B2 | | 11/2017 | Konno |
| 10,611,012 B2 | | 4/2020 | Adelman et al. |
| 2006/0207390 A1 | * | 9/2006 | Kehoe ..................... B67B 7/16 81/3.09 |
| 2014/0143958 A1 | * | 5/2014 | Barr ......................... B25F 1/00 7/138 |

FOREIGN PATENT DOCUMENTS

| | | |
|---|---|---|
| CN | 201099604 Y | 8/2008 |
| CN | 201842626 U | 5/2011 |
| CN | 201842626 U | 5/2011 |
| CN | 203175181 U | 9/2013 |
| DE | 6213001 U1 | 1/1993 |
| DE | 20 2012 104 516 U1 | 12/2012 |
| GB | 190524304 A | 6/1906 |

OTHER PUBLICATIONS

PCT International Search Report dated Jun. 8, 2016 issued in PCT App. No. PCT/US15/18944 (2 pages).
PCT Written Opinion dated Jun. 8, 2016 issued in PCT App. No. PCT/US15/18944 (4 pages).
Office action issued in related Chinese patent application No. 201580021272.2 dated Aug. 9, 2019 (9 pages including English translation).

* cited by examiner

KEY SHAPED MULTITOOL

BACKGROUND

Many types of tools exist that are adapted to do a variety of tasks. There are many known devices that can serve as multiple tools at once. The most famous example may be the Swiss Army Knife. There are many variations of the Swiss Army Knife, which consists of many tools sandwiched into an enclosure that can be rotated out when the user needs them. These types of multi-tools are very useful, but are large, heavy and bulky, making them difficult to transport in a pocket or on a keychain. It is desirable to construct a multitool that has a high degree of usefulness while maintaining small size, transportability, and a low profile.

BRIEF SUMMARY OF THE INVENTION

Embodiments of a multi-tool are in the general shape of a key. Embodiments of the multi-tool are configured to perform multiple tasks with the following components: bottlecap remover, flat-head screwdriver, scoring edge, serrated edge and file edge. Embodiments of the multi-tool assist with the following tasks: removing bottlecaps, opening boxes, loosening or tightening screws, cutting price tags, clipping coupons, removing staples, breaking and cutting foil and film, sawing rope or twine, splitting pills, scratching lottery tickets, opening letters, sanding and filing, cutting plastic clamshell packaging. Embodiments of the multi-tool are sharp enough to cut and score many items, but not sharp enough to cut the user, making the tool safe enough to carry in a pocket or take through airport security. Embodiments of the multi-tool may also comprise a cutout for attaching it to a keychain, or may comprise a grip texture on one or both sides for holding more easily between fingers.

In one embodiment, a multi-tool includes a keyshaped body, the keyshaped body having a key like shape and a standard key size. The keyshaped body includes a rounded end, the rounded end including a aperture for a key chain and a textured surface configured to provide grip to the hand of a user. The keyshaped body further includes a slim extending end, opposite the rounded end, the slim extending end including a tip, the tip having a wedge end, the wedge end shaped such that it functions as a screw driver, the slim end further included a left and right side, the left side having a grooved surface shaped such that it functions as file, the right side including a cutting surface and a lip, the lip providing for a bottle opener in conjunction with an aperture in which the cutting surface is located and using the keyshaped body as a lever arm. Optionally, the cutting surface is a serrated surface. Alternatively, the serrated surface recessed in a cutout of the slim extending end, the cutout shaped to accommodate a bottle cap and having the lip on one end, such the lip is placeable under an edge of the bottle cap when the bottle cap is in the cutout. In one configuration, the textured surface has a graphic shape. In one alternative, the graphic shape is that of a skull. In another alternative, the keyshaped body is less than four inches long. Alternatively, the keyshaped body is less than 2 inches wide. Optionally, the wedge end is tampered from approximate 1.5 mm in width to 0.5 mm in width at a tip. Alternatively, the wedge end is tapered to 0.5 mm or less in width. Optionally, the wedge end and the serrated surface is not sharp enough to cut a user during normal use.

In another embodiment, a multi-tool includes essentially a keyshaped body, the keyshaped body having a key like shape and a standard key size. The keyshaped body includes a rounded end, the rounded end including a aperture for a key chain and a textured surface configured to provide grip to the hand of a user. The keyshaped body further includes a slim extending end, opposite the rounded end, the slim extending end including a tip, the tip having a wedge end, the wedge end shaped such that it functions as a screw driver, the slim end further included a left and right side, the left side having a grooved surface shaped such that it functions as file, the right side including a cutting surface and a lip, the lip providing for a bottle opener in conjunction with an aperture in which the cutting surface is located and using the keyshaped body as a lever arm. Optionally, the cutting surface is a serrated surface. Alternatively, the serrated surface recessed in a cutout of the slim extending end, the cutout shaped to accommodate a bottle cap and having the lip on one end, such the lip is placeable under an edge of the bottle cap when the bottle cap is in the cutout. In one configuration, the textured surface has a graphic shape. In one alternative, the graphic shape is that of a skull. In another alternative, the keyshaped body is less than four inches long. Alternatively, the keyshaped body is less than 2 inches wide. Optionally, the wedge end is tampered from approximate 1.5 mm in width to 0.5 mm in width at a tip. Alternatively, the wedge end is tapered to 0.5 mm or less in width. Optionally, the wedge end and the serrated surface is not sharp enough to cut a user during normal use.

In another embodiment, a multitool includes a keyshaped body, the keyshaped body having a key like shape and a standard key size. The key shaped body includes a first end. The keyshaped body further includes a slim extending end, opposite the first end, the slim extending end including a tip, the tip having a wedge end, the wedge end shaped such that it functions as a screw driver, the slim end further included a left and right side, the right side including a cutting surface and a lip, the lip providing for a bottle opener in conjunction with an aperture in which the cutting surface is located and using the keyshaped body as a lever arm. Optionally, the left side having a grooved surface shaped such that it functions as file. Alternatively, the first end is a rounded end and includes a aperture for a key chain. In one configuration, the rounded end includes a textured surface configured to provide grip to the hand of a user. In another configuration, the cutting surface is a serrated surface. Optionally, the serrated surface recessed in a cutout of the slim extending end, the cutout shaped to accommodate a bottle cap and having the lip on one end, such the lip is placeable under an edge of the bottle cap when the bottle cap is in the cutout.

DETAILED DESCRIPTION

Embodiments of a multi-tool generally include objects having an approximately key shape and size that include various surfaces and features that provide for enhanced utility. Such multi-tools are desirable to users because a very useful tool is provided in a small size that it easily placed on a keychain or in a pocket. In this way the multi-tool provides for ready use without causing significant bulk.

Figure 1:
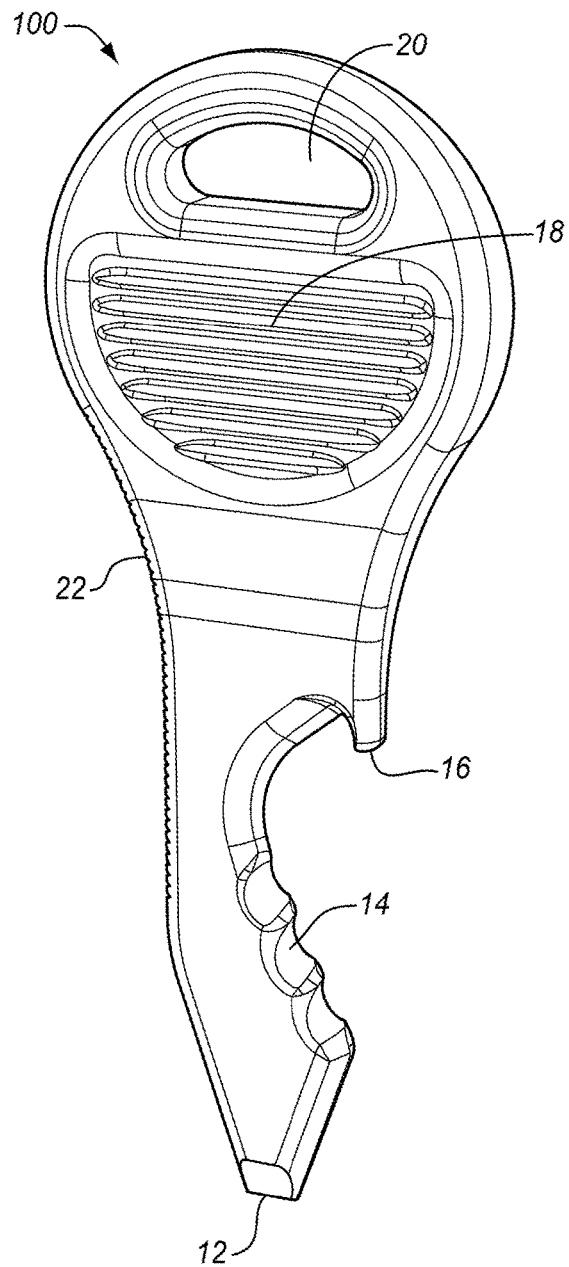
FIG. 1 shows a front perspective view of one embodiment of a keyshaped multi-tool.

FIG. 1 shows a front perspective view of one embodiment of a keyshaped multi-tool. Keyshaped multi-tool 100 includes a body having a rounded portion and a slim extending portion. The rounded portion includes a textured area 18 that provides for enhanced gripping by the hands and fingers of a user. The rounded portion also includes aperture 20 that allows for the multi-tool 100 to be places on a keychain. The slim extending portion includes a left and right side. The left side may include a file portion 22 that has raised groves designed such that they may be used as a file. The right opposing side includes a bottle opener consisting of protrusion or lip 16 and the void space or cutout of the slim extending portion. Much like a normal bottle opener, this combination fits under the edge of the bottle cap and provides for grip and leverage to remove bottle caps.

Additionally, in the cutout area of the slim extending portion, a serrated cutting surface 14 is included. This location is useful and particular, because the serrated cutting surface 14 is retracted in this position and less likely to unintentionally interface with other surfaces. In many configurations, serrated cutting surface 14 is not sharpened such that it may easily cut the skin of a user. In this configuration, due to the serrated nature, the serrated cutting surface 14 is still useful for cutting packaging and other everyday objects, but may be Transportation Security Authority compliant and ultimately not dangerous as a weapon. Additionally, wedge 12 is included in multi-tool 100. Wedge 12 is similarly still useful for cutting packaging and other everyday objects, but may be Transportation Security Authority compliant and ultimately not dangerous as a weapon. Wedge 12 may generally terminate in a 0.5 mm thick end which is useful as described, but not overly sharp. This is additionally important, because the multi-tool 100 is likely to be located on a keychain without a sheath or other protection for wedge 12. It would be undesirable for a user to be easily cut by wedge 12. Additionally, wedge 12 may function as a screw driver. The edge of wedge 12, progressing from a thickness of 1.5 mm to 0.5 mm, also makes the wedge end more useful for prying or other similar activities, since it is less likely to break than a truly sharp end. Ultimately, the corners of wedge 12 are as narrow as 0.2 mm to 0.05 mm. This narrowness provides for necessary scoring or other activities.

Additionally, the multi-tool 100 has a very narrow width while still being a useful tool. For instance, in many configurations, multi-tool 100 may only be about 4-6 mm thick. Additionally, multi-tool 100 may only be about 20-30 mm wide and may only be 50-70 mm long. Such small size allows the multi-tool 100 to mimic the configurations of a key allowing for the user to very easily carry the device.

Methods of use include using wedge 12 for scoring, prying, and as a screw driver. Serrated cutting surface 14 may be used for cutting various objects including packaging and other plastic materials. File portion 22 may be used in various scenarios to file or smooth objects. Lip 18 may be used in the opening of bottles and other levered prying scenarios.

Figure 2:
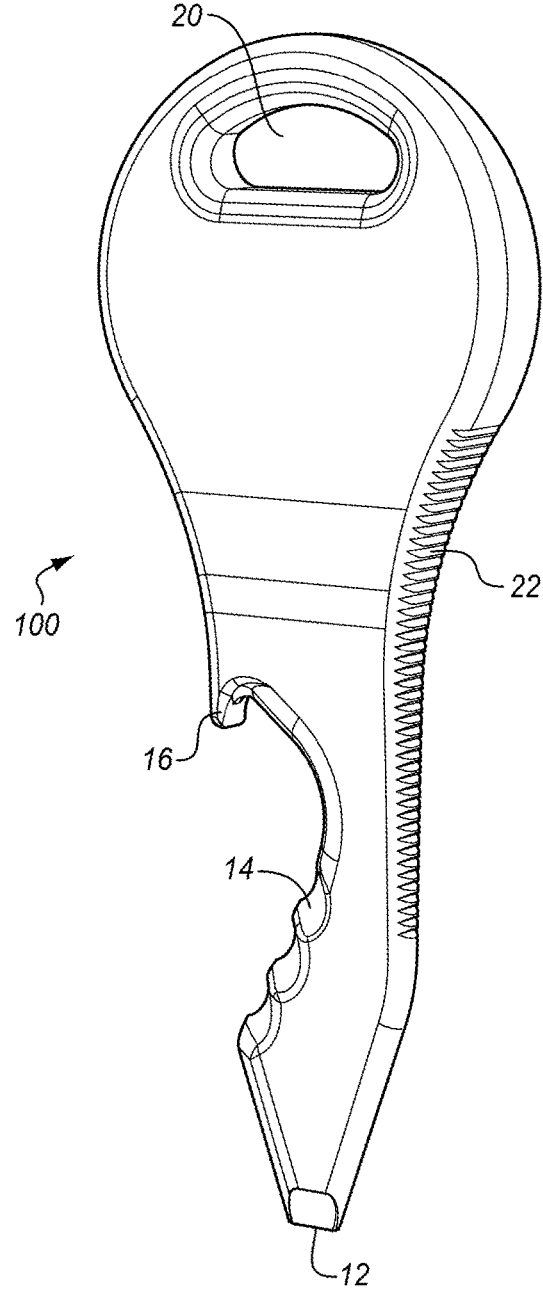
FIG. 2 shows a rear perspective view of the keyshaped multi-tool of FIG. 1.
Figure 3:
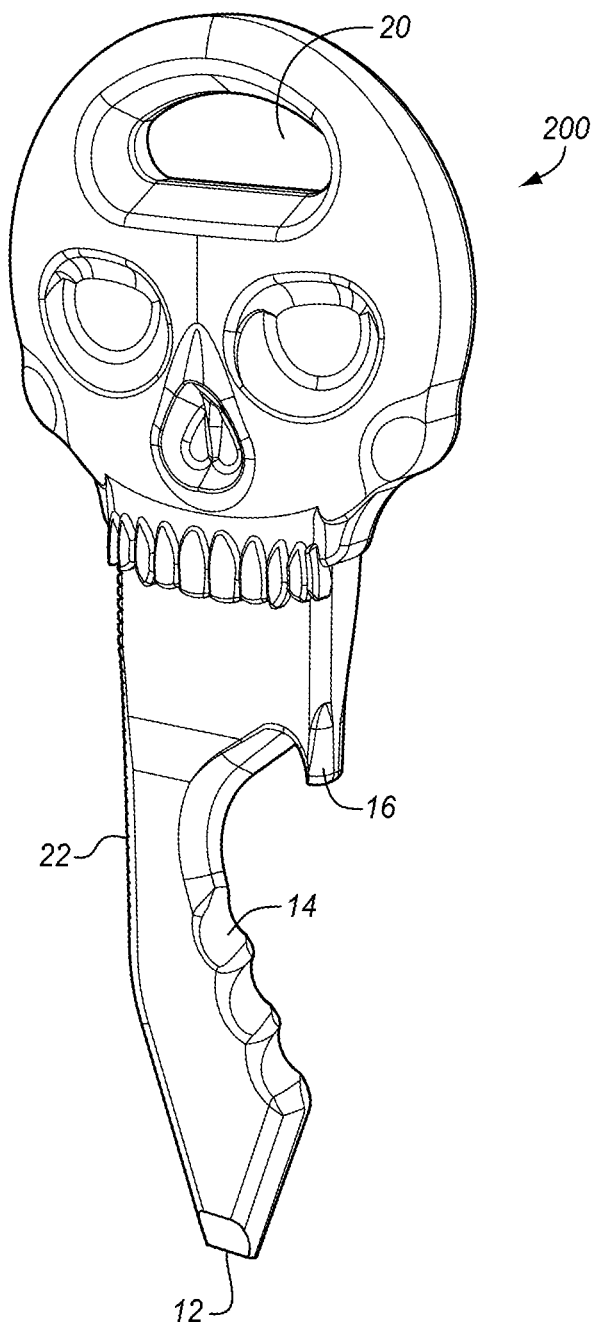
FIG. 3 shows a front perspective view of an alternative embodiment of a keyshaped multi-tool.

FIG. 2 shows a rear perspective view of the keyshaped multi-tool of FIG. 1. FIG. 3 shows a front perspective view of an alternative embodiment of a keyshaped multi-tool. In this embodiment textured area 18 still exists, however, it is in the form of graphic design. By incorporating a graphic design with relief features, the textured area 18 may function both as a decoration and a useful gripping area.

Figure 4:
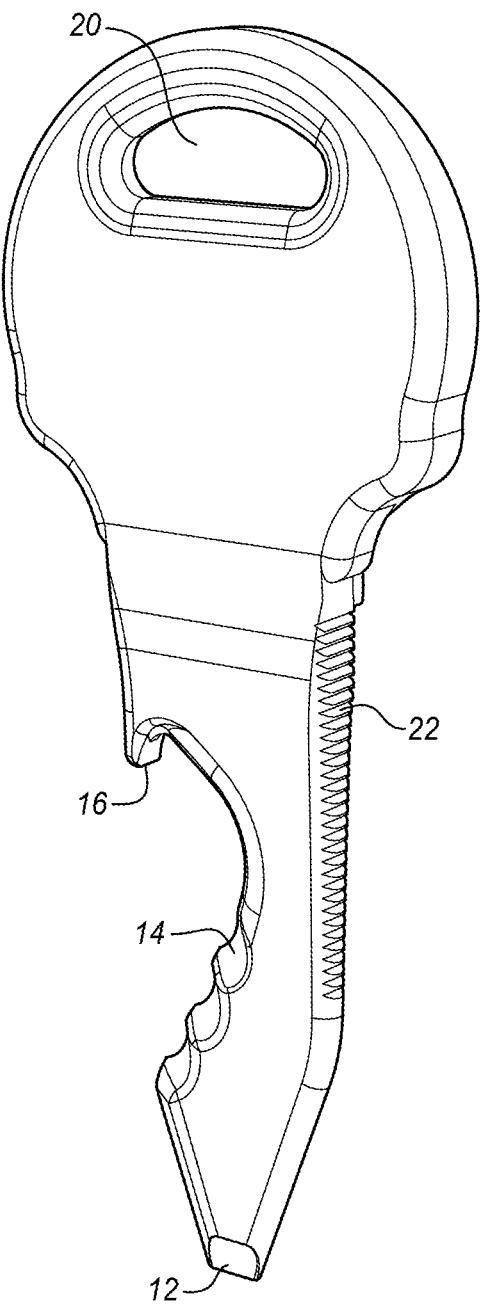
FIG. 4 shows a rear perspective view of the keyshaped multi-tool of FIG. 3.
Figure 5:
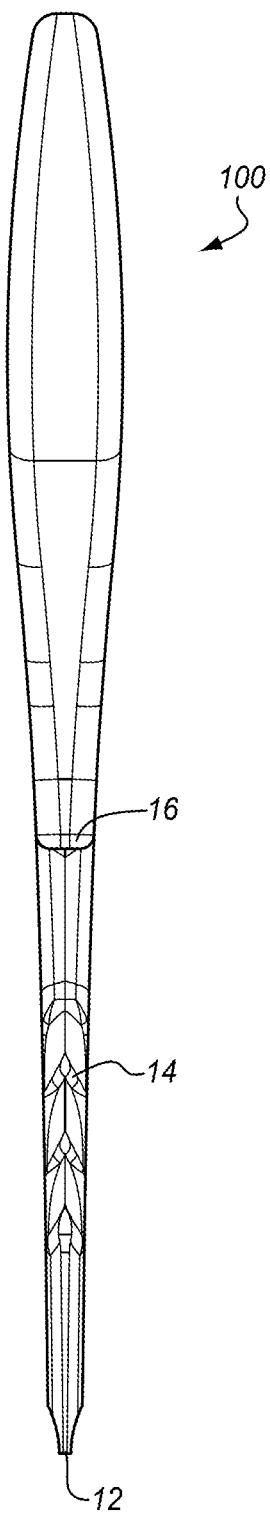
FIG. 5 shows a side view of the keyshaped multi-tool of FIG. 1.
Figure 6:
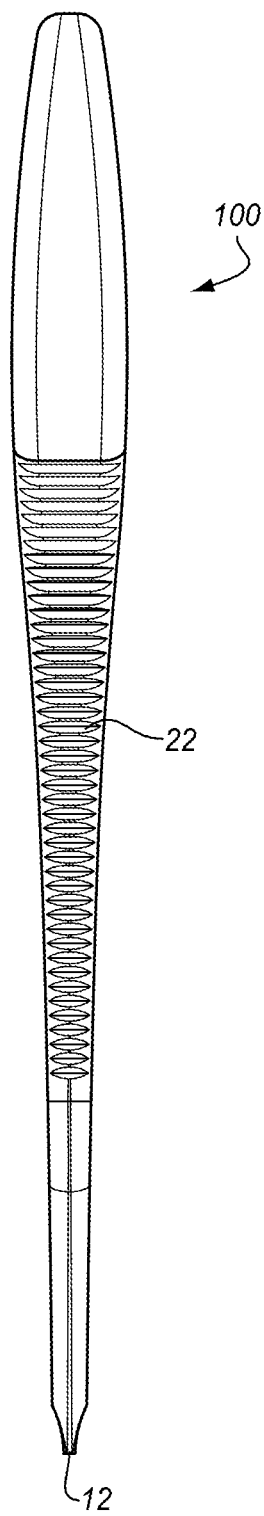
FIG. 6 shows an opposite side view of the keyshaped multi-tool of FIG. 1.

FIG. 4 shows a rear perspective view of the keyshaped multi-tool of FIG. 3. FIG. 5 shows a side view of the keyshaped multi-tool of FIG. 1. FIG. 6 shows an opposite side view of the keyshaped multi-tool of FIG. 1.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of this disclosure is not limited to the particular examples and implementations disclosed herein but is intended to cover modifications within the spirit and scope thereof as defined by the appended claims and any and all equivalents thereof.

The invention claimed is:

1. A multitool comprising:
    a keyshaped body, the keyshaped body having a key like shape and a standard key size, the keyshaped body including:
        a rounded end, the rounded end including an aperture for a key chain and a textured surface configured to provide grip to the hand of a user, the textured surface defined by a plurality of ridges and grooves; and
        a slim extending end, opposite the rounded end, the slim extending end including a wedge-shaped end defining a screwdriver tip, the slim end further comprising a left and right side, the left and right sides tapering symmetrically at the wedge-shaped end to define the screwdriver tip, the left side having a grooved surface shaped such that it functions as a file, the file extending along portions of both the rounded end and the slim extending end, the right side including a single cutting edge and a lip, the lip and single cutting edge providing for a bottle opener in conjunction with a cutout in which the single cutting edge is located and using the keyshaped body as a lever arm, wherein the single cutting edge is a serrated knife edge at least partially defining the cutout for the bottle opener in the slim end, the cutout shaped to accommodate a bottle cap and having the lip on one end and the serrated knife edge on the other end, such that the lip is placeable under an edge of the bottle cap and the serrated knife edge is placeable on top of the bottle cap when the bottle cap is in the cutout, the lip and serrated knife edge creating a prying structure to remove the bottle cap from a bottle.

2. The keyshaped multitool of claim 1, wherein the textured surface has a graphic shape.

3. The keyshaped multitool of claim 2, wherein the graphic shape is that of a skull.

4. The keyshaped multitool of claim 1, wherein the keyshaped body is less than four inches long.

5. The keyshaped multitool of claim 4, wherein the keyshaped body is less than 2 inches wide.

6. The keyshaped multitool of claim 1, wherein the wedge-shaped end tapers from approximate 1.5 mm in width to 0.5 mm in width at a tip.

7. The keyshaped multitool of claim 1, wherein the wedge-shaped end is tapered to 0.5 mm or less in width.

8. The keyshaped multitool of claim 1, wherein each of the wedge-shaped end and the serrated surface is designed to limit cutting of a user's skin during normal use.

9. A multitool, consisting essentially of:
a keyshaped body, the keyshaped body having a key like shape and a standard key size, the keyshaped body including:
- a rounded end, the rounded end including an aperture for a key chain and a textured surface configured to provide grip to the hand of a user, the textured surface defined by a plurality of ridges and grooves; and
- a slim extending end, opposite the rounded end, the slim extending end including a wedge-shaped end defining a screwdriver tip, the slim end further comprising a left and right side, the left and right sides tapering symmetrically at the wedge-shaped end to define the screwdriver tip, the left side having a grooved surface shaped such that it functions as a file, the file extending along portions of both the rounded end and the slim extending end, the right side including a single cutting edge and a lip, the lip and single cutting edge providing for a bottle opener in conjunction with a cutout in which the single cutting edge is located and using the keyshaped body as a lever arm, wherein the single cutting edge is a serrated knife edge at least partially defining the cutout for the bottle opener in the slim end, the cutout shaped to accommodate a bottle cap and having the lip on one end and the serrated knife edge on the other end, such that the lip is placeable under an edge of the bottle cap and the serrated knife edge is placeable on top of the bottle cap when the bottle cap is in the cutout, the lip and serrated knife edge creating a prying structure to remove the bottle cap from a bottle.

10. The keyshaped multitool of claim 9, wherein the textured surface has a graphic shape.

11. The keyshaped multitool of claim 10, wherein the graphic shape is that of a skull.

12. The keyshaped multitool of claim 9, wherein the keyshaped body is less than four inches long.

13. The keyshaped multitool of claim 12, wherein the keyshaped body is less than 2 inches wide.

14. The keyshaped multitool of claim 9, wherein the wedge-shaped end tapers from approximate 1.5 mm in width to 0.5 mm in width at a tip.

15. The keyshaped multitool of claim 9, wherein the wedge-shaped end is tapered to 0.5 mm or less in width.

16. The keyshaped multitool of claim 9, wherein each of the wedge-shaped end and the serrated surface is designed to limit cutting of a user's skin during normal use.

* * * * *